March 21, 1933.　　　H. HOLZWARTH　　　1,901,873
MULTISTAGE CONSTANT VOLUME EXPLOSION PROCESS AND APPARATUS
Filed Aug. 17, 1926
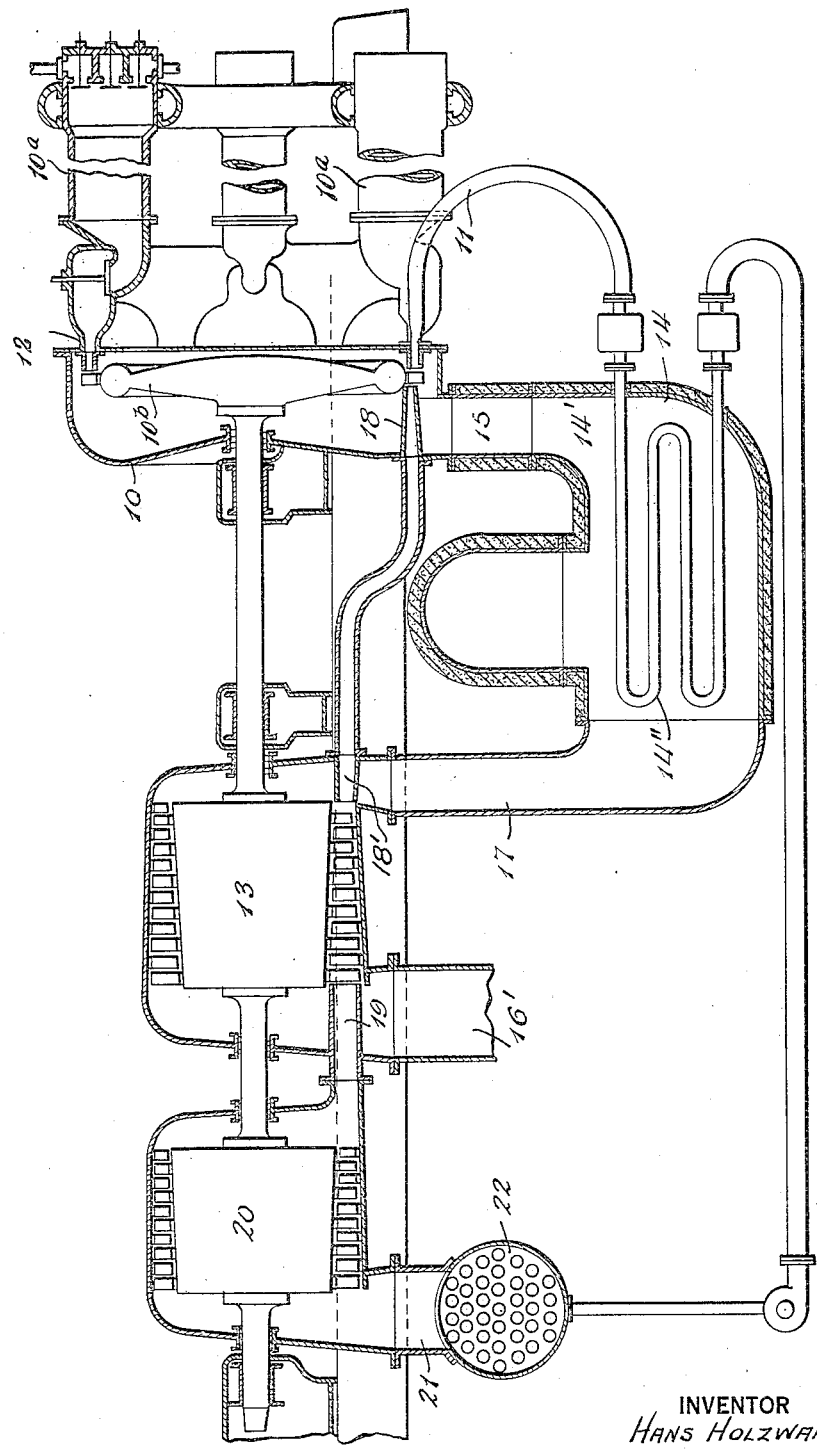
INVENTOR
Hans Holzwarth
BY
ATTORNEYS Patented Mar. 21, 1933

1,901,873

UNITED STATES PATENT OFFICE

HANS HOLZWARTH, OF DÜSSELDORF, GERMANY, ASSIGNOR TO HOLZWARTH GAS TURBINE CO., OF SAN FRANCISCO, CALIFORNIA, A CORPORATION OF DELAWARE

MULTISTAGE CONSTANT VOLUME EXPLOSION PROCESS AND APPARATUS

Application filed August 17, 1926. Serial No. 129,738.

The present invention relates to constant volume explosion turbines wherein driving gases of high temperature and pressure are generated in one or more constant volume explosion chambers from which they are discharged to perform work outside such chambers.

Explosion turbine plants of the single-stage type hitherto proposed (see, for example, my United States Patent 877,194) suffered generally from a low efficiency and high mechanical stresses in the turbine rotor. The low efficiency was due in part not only to the lower efficiency of the impulse rotor employed in such plant, as compared with a multistage reaction turbine, but also to the large fluctuations in velocity arising from the fact that the total gas pressure drop down to atmospheric pressure was effected in the nozzle in advance of the explosion rotor. Moreover, the powerful impacts of the puffs of explosion gases against the blades of the rotor operating against substantially atmospheric back pressure produced very large mechanical stresses in the rotor blades, which stresses, especially at the high temperatures involved, seriously taxed the strength of the blades.

It is the object of the present invention to provide an improved process and apparatus for the utilization of the heat and pressure energy of gases generated under constant volume, such process and apparatus being characterized by an improved efficiency and by a reduction in the stresses on the explosion rotor.

According to the present invention, the total pressure or pressure head of the explosion gases is split in such a manner that the higher range, that is, the rapidly fluctuating portion thereof, is converted into velocity energy which is then utilized in an impulse turbine operating against an exhaust pressure which is considerably above atmospheric. The successive exhausting puffs of gas are then collected and their pressure equalized in a suitable pressure equalizer, and the gases then charged in a continuous stream into an intermediate pressure continuous current turbine wherein the gases are expanded down to atmospheric pressure. With my improved process and arrangement, the explosion gases discharged by the explosion chambers are only partially expanded in the nozzles in advance of the explosion rotor; hence the efficiency of these nozzles and of the explosion rotor is improved since the difference in pressure between the first portion and the last portion of a puff of gases entering the nozzles is reduced, and thereby fluctuations in the velocity of the gases fed to the first rotor are correspondingly reduced. At the same time the stresses on the rotor blades are reduced by the reduced velocity of the gases resulting from the increase in the back pressure of the explosion turbine. The gases exhausting from the first turbine, after pressure equalization, are fed to the continuous current gas turbine which may comprise one or more separate turbine stages. With my improved arrangement, therefore, not only is the efficiency of the explosion turbine increased, but a large part of the energy of the gases is utilized at even higher efficiency in the continuous current turbine. My improved process and apparatus thus have the advantage of the high efficiency of the explosion process together with the superior efficiency of the constant pressure, continuous current turbine.

In practice, the pressure equalizer generally has additional functions, for instance, it may serve at the same time as a heater or heat-exchanger. From the point of view of my present invention, however, these additional functions are of secondary importance.

A satisfactory embodiment of the invention is illustrated by way of example on the accompanying drawing.

In said drawing, the numeral 10 indicates diagrammatically the explosion turbine, which is of the impulse type and is arranged to receive the successive puffs of explosion gases intermittently discharged from each of a number of constant volume explosion chambers 10a of any known or suitable construction having intermittently operated inlet valves for fuel, combustion supporting air and scavenging air, and outlet valves for the explosion gases, and associated with or forming part of such turbine, the gases from the chambers entering separate nozzles 12 wherein they are partially expanded and by which they are directed against the blades of the turbine rotor 10b. In the latter the kinetic energy of the partially expanded gases is converted into mechanical energy. Where cooling of the blades is necessary, they may be cooled by means of steam generated as described hereinbelow, such steam being fed to the turbine by a pipe 11. Separate outlets are provided for the steam and for the combustion gases exhausing from said turbine 10. At 13 I have indicated a second turbine, operating at an intermediate pressure, and this turbine is preferably a multiple stage turbine. At 14 I have shown a pressure equalizer, which in this particular instance is constructed to also serve as a heater. For this purpose, said apparatus 14 has two separate paths or chambers, through one of which, 14', flow the hot exhaust combustion gases coming from the explosion turbine 10, while the medium to be heated flows through, or is contained in, the other chamber or coil 14''. For instance the chamber 14'' may contain water, and the apparatus 14 may constitute a boiler for generating steam from such water.

The combustion gases from the high pressure turbine 10 pass through the pipe 15 to the pressure-equalizing path or chamber 14' of the apparatus 14, and then from the outlet of such path or chamber through a pipe 17 to the combustion gas inlet of the intermediate pressure turbine 13, exhausting into the atmosphere, as through a pipe 16, from the combustion gas outlet of the intermediate pressure turbine. The latter, like the high pressure turbine 10, has separate outlets for steam and combustion gases, as well as separate inlets for these media. The details of the turbines form no part of my present invention, and therefore have not been illustrated.

Steam exhausting from the high pressure turbine 10 passes through a pipe 18 to the steam inlet 18' of the intermediate pressure turbine 13. From the steam outlet of the intermediate pressure turbine 13 the exhaust steam passes through a pipe 19 to the inlet of a low-pressure turbine 20, from the outlet of which the final exhaust steam passes through a pipe 21 to a condenser 22. It will be understood that the steam exhausting from the high pressure turbine stage in which it operates as a cooling medium may be at a higher temperature than that at which it was charged into such turbine; and that after expansion in the intermediate pressure turbine 13, it is still under sufficient pressure to perform useful work in the condensing steam turbine 20.

Inasmuch as the steam inlet 18' is in substantial alignment with the receiving nozzle 19, the steam has a practically direct separate path through the intermediate pressure turbine 13, and will therefore not mix with the combustion gases flowing through said turbine. Similarly the steam passing through the high pressure turbine to the pipe 18 comes from a nozzle in substantial alignment with the inlet of said pipe, and is therefore kept separate from the combustion gases passing through the high pressure turbine.

The chamber 14' of the apparatus 14 is made of proper dimensions to act as a regulator or equalizer so as to secure a flow of combustion gases at a practically uniform pressure and velocity notwithstanding the fact that such gases leave the high pressure turbine in puffs, or in other words, with an irregular or fluctuating pressure. The substantially uniform pressure prevailing in the equalizing chamber 14' is of course lower than the pressure at which the combustion gases are originally admitted to the nozzles of the high pressure turbine 10. The arrangement indicated in the drawing is particularly effective in delivering the exhaust combustion gases at a virtually constant pressure and velocity to the intermediate pressure turbine 13. As has been mentioned hereinabove, the apparatus 14 in addition to its main function of equalizing the pressure of the exhaust gases, may also be provided with a heat exchanger to abstract heat from the gases. For instance, the heat exchanger 14'' may contain any suitable fluid, such as water or steam, for the purpose of preheating water, generating steam or superheating steam; in the example illustrated, the coils of the exchanger are fed with the water condensed in the condenser 22 for the purpose of generating steam, which is then charged against the blades of the turbine 10. The absorption of heat from the combustion gases flowing through the chamber or path 14' increases the pressure-equalizing effect.

Various modifications may be made without departing from the nature of my invention as set forth in the appended claims.

I claim:

1. A multistage explosion gas turbine comprising a plurality of explosion chambers into which charges of fuel and air are intermittently fed and exploded and from which the explosion gases are discharged at high velocity in intermittent puffs, a turbine against which the high velocity gases are charged and in which the kinetic energy of the gases is converted into mechanical energy, the gases exhausting from such turbine in puffs at comparatively low velocity, an exhaust chamber arranged to receive the gases exhausting from said turbine and of sufficient size to equalize the pressure of the exhaust puffs of gas, and a low pressure stage driven by the gases discharged by said pressure equalizer exhaust chamber, said equalizer chamber charging said exhaust gases at substantially uniform pressure to the low pressure stage.

2. The combination as set forth in claim 1, including heat exchange apparatus associated with said pressure equalizer exhaust chamber to abstract heat from the exhaust gases.

3. The combination as set forth in claim 1 including conduits for charging steam separately of the gases against the first-mentioned turbine, catch nozzles arranged on the exhaust side of said turbine for catching the steam after its passage through the turbine, and conduits for conducting the exhaust steam to the low pressure turbine separately of said gases.

4. The combination as set forth in claim 1 including conduits for charging steam separately of the gases against the first-mentioned turbine, a catch nozzle arranged on the exhaust side of said turbine for catching the steam after its passage through the turbine, a conduit for conducting the exhaust steam to the low pressure turbine separately of said gases, and a steam turbine stage driven by the exhaust steam from said low pressure stage.

5. The improvement in the art of generating power which comprises exploding intermittently mixtures of fuel and air under constant volume, converting part of the pressure energy of the explosion gases into kinetic energy of flow of a succession of puffs at a pressure above atmospheric, converting such kinetic energy into mechanical energy, equalizing the pressure of the exhausting puffs of gases, and then converting the residual pressure energy of the exhaust gases into mechanical energy.

6. The improvement in the art of generating power which comprises exploding intermittently mixtures of fuel and air under constant volume, converting part of the pressure energy of the explosion gases into kinetic energy of flow of a succession of puffs at a pressure above atmospheric, converting such kinetic energy into mechanical energy, equalizing the pressure of the exhausting puffs of gases and abstracting heat from such exhaust gases to cool the same, and then converting the residual pressure energy of the exhaust gases into mechanical energy.

7. A power plant comprising an explosion chamber provided with an outlet valve for the intermittent discharge of explosion gases, a high pressure turbine having separate inlets for steam and for the combustion gases issuing from said chamber and also having separate outlets for said steam and combustion gases, a heat exchanger having an inlet connected with the combustion gas outlet of said turbine and also having an outlet, an intermediate pressure turbine having separate inlets for steam and combustion gases, the combustion gas inlet of such intermediate pressure turbine being connected with the outlet of said heat exchanger, and the steam inlet of said intermediate pressure turbine being connected with the steam outlet of said high pressure turbine, said intermediate pressure turbine having an outlet for combustion gases opening into the atmosphere and a separate outlet for steam, a low pressure turbine having an inlet connected with the steam outlet of the intermediate pressure turbine and also provided with an outlet, and a condenser connected with said outlet.

8. A power plant comprising an explosion chamber provided with an outlet valve for the intermittent discharge of explosion gases, a high pressure turbine having separate inlets for steam and for the combustion gases issuing from said chamber and also having separate outlets for said steam and combustion gases, a heat exchanger having an inlet connected with the combustion gas outlet of said turbine and also having an outlet, an intermediate pressure multi-stage turbine having separate inlets for steam and combustion gases, the combustion gas inlet of such intermediate pressure turbine being connected with the outlet of said heat exchanger, and the steam inlet of said intermediate pressure turbine being connected with the steam outlet of said high pressure turbine, said intermediate pressure turbine having an outlet for combustion gases opening into the atmosphere and a separate outlet for steam, a low pressure multi-stage turbine having an inlet connected with the steam outlet of the intermediate pressure turbine and also provided with an outlet, and a condenser connected with said outlet.

9. A power plant comprising an explosion chamber provided with an outlet valve for the intermittent discharge of explosion gases, a high pressure turbine having separate inlets for steam and for the combustion gases issuing from said chamber and also having separate outlets for said steam and combustion gases, a heat exchanger having an inlet connected with the combustion gas outlet of said turbine and also having an outlet, an intermediate pressure multi-stage turbine having separate inlets for steam and combustion gases, the combustion gas inlet of such intermediate pressure turbine being connected with the outlet of said heat exchanger, and the steam inlet of said intermediate pressure multi-stage turbine being connected with the steam outlet of said high pressure turbine, said intermediate pressure turbine having separate outlets for steam and for combustion gases respectively, and a low pressure steam engine having an inlet connected with the steam outlet of said intermediate pressure turbine.

10. A power plant comprising a high pressure turbine having separate inlets for steam and for combustion gases under pressure and also having separate outlets for said steam and combustion gases, a heat exchanger having an inlet connected with the combustion gas outlet of said turbine and also having an outlet, an intermediate pressure turbine having separate inlets for steam and combustion gases, the combustion gas inlet of such intermediate pressure turbine being connected with the outlet of said heat exchanger, and the steam inlet of said intermediate pressure turbine being connected with the steam outlet of said high pressure turbine, said intermediate pressure turbine having an outlet for combustion gases opening into the atmosphere and a separate outlet for steam, and a low pressure multi-stage steam turbine having an inlet connected with the steam outlet of the intermediate pressure turbine.

HANS HOLZWARTH.